US007643846B2

(12) United States Patent
Koch et al.

(10) Patent No.: US 7,643,846 B2
(45) Date of Patent: *Jan. 5, 2010

(54) RETRIEVING VOICE-BASED CONTENT IN CONJUNCTION WITH WIRELESS APPLICATION PROTOCOL BROWSING

(75) Inventors: Robert A. Koch, Norcross, GA (US); Arnold Chester McQuaide, Jr., Berkeley Lake, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 436 days.

This patent is subject to a terminal disclaimer.

(21) Appl. No.: 11/586,293

(22) Filed: Oct. 25, 2006

(65) Prior Publication Data

US 2007/0129073 A1 Jun. 7, 2007

Related U.S. Application Data

(63) Continuation of application No. 09/894,257, filed on Jun. 29, 2001, now Pat. No. 7,151,763.

(51) Int. Cl.
*H04L 12/66* (2006.01)
*H04L 12/56* (2006.01)
*H04M 1/00* (2006.01)

(52) U.S. Cl. .................. 455/550.1; 370/352; 370/401
(58) Field of Classification Search ................ 455/466, 455/428, 560; 719/310; 715/234; 370/352, 370/400
See application file for complete search history.

(56) References Cited

U.S. PATENT DOCUMENTS

| 6,493,558 B1 | 12/2002 | Bernhart et al. ............. 455/466 |
| 6,788,667 B1 * | 9/2004 | Beresin ...................... 370/338 |
| 2002/0087596 A1 | 7/2002 | Lewontin .................... 707/513 |
| 2002/0112081 A1 | 8/2002 | Armstrong et al. .......... 709/246 |
| 2002/0194388 A1 | 12/2002 | Boloker et al. .............. 709/310 |

* cited by examiner

*Primary Examiner*—Kent Chang
*Assistant Examiner*—Nizar Sivji

(57) ABSTRACT

A WAP-enabled device can request text-based and/or voice based content from a WAP Server. The WAP device communicates over a conventional wireless service provider network. This network provides a connection between the WAP device and a WAP Gateway. The WAP Gateway operates as a gateway between the wireless service provider network and the TCP/IP-based Internet. Content requests are sent from the WAP gateway to the WAP Server. When a request for voice-based content delivery is received, the WAP Server responds by sending a TCP/IP instruction to a Voice Portal Node. The Voice Portal Node is operative to establish a voice-based communication session with the WAP device. The WAP Server will transmit voice-based content to the Voice Portal Node. An audible transmission is then played over the telephone connection established between the Voice Portal Node and the WAP device in response to the request initiated by the WAP device.

20 Claims, 8 Drawing Sheets

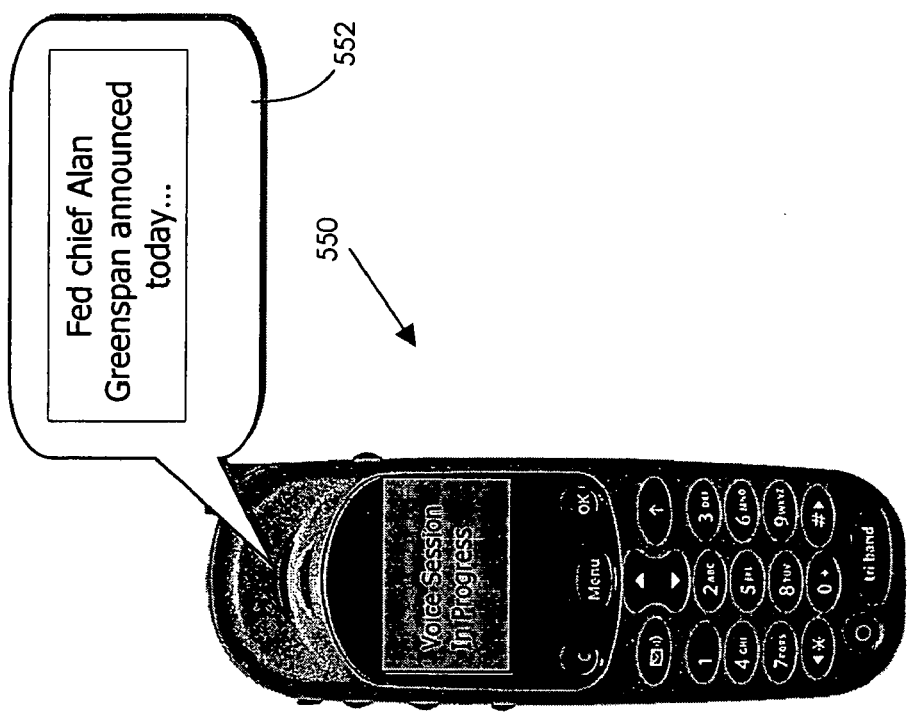
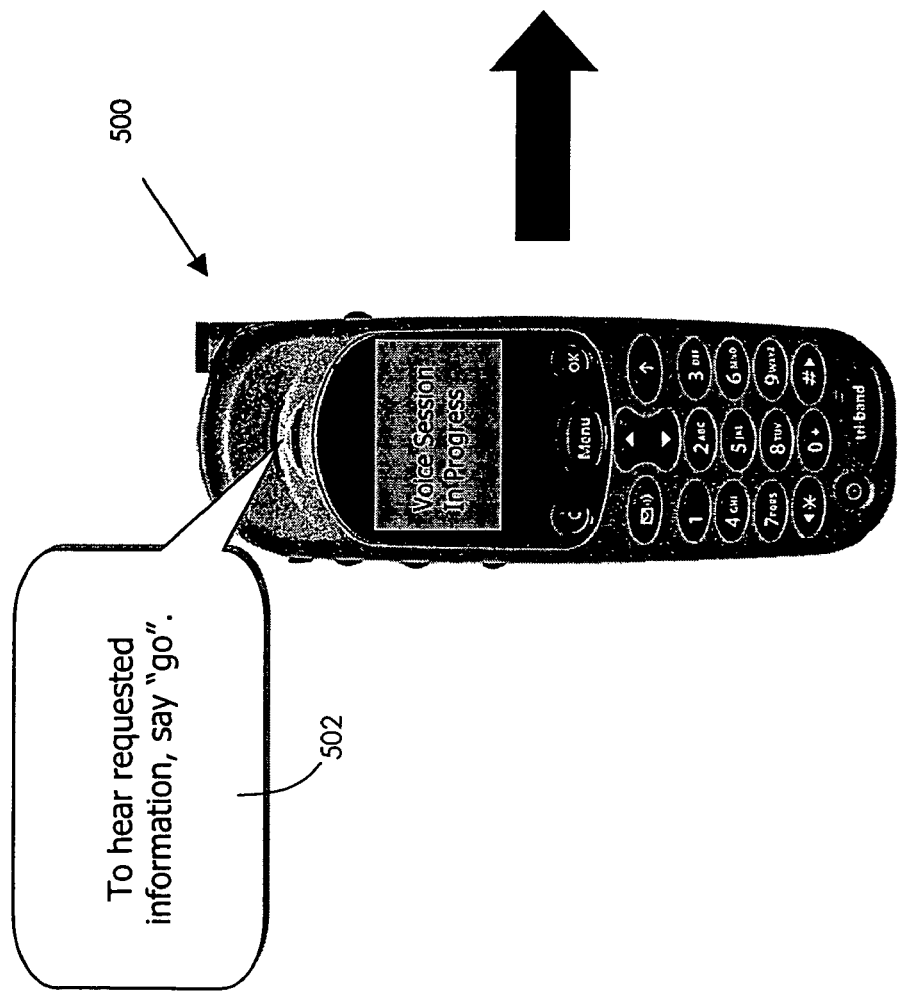
Fig. 5

RETRIEVING VOICE-BASED CONTENT IN CONJUNCTION WITH WIRELESS APPLICATION PROTOCOL BROWSING

CROSS-REFERENCE TO RELATED APPLICATIONS

The present application is a continuation of U.S. patent application Ser. No. 09/894,257, entitled "Retrieving Voice-Based Content in Conjunction with Wireless Application Protocol Browsing," filed Jun. 29, 2001 now U.S. Pat. No. 7,151,763, and assigned to the same assignee as this application. The aforementioned patent application is expressly incorporated herein, in its entirety, by reference.

FIELD OF THE INVENTION

The present invention generally relates to delivering content to wireless devices. More particularly, the present invention relates to delivering voice-based content over existing telephony and Internet infrastructure thereby enabling combined voice-based and visual-based content delivery to a single wireless device.

BACKGROUND OF THE INVENTION

Wireless Application Protocol (WAP) is a telecommunications industry standard that has been developed to deliver data content to cellular telephones and other wireless devices. WAP was developed in large part to promote uniform specifications for technology useful for developing applications and services that operate over wireless communication networks. WAP specifies an application framework and network protocols for wireless devices such as mobile telephones, pagers, and personal digital assistants (PDAs).

One objective of the WAP specification is to extend mobile networking technologies (such as digital data networking standards) and Internet technologies (such as XML, URLs, scripting, and various content formats). WAP-enabled devices have been used to deliver Internet content and other data services to users of wireless devices. Conventional WAP-based systems have been used to deliver text-based content to wireless devices. Examples of text-based content that has been delivered using WAP-based systems include: email, sports scores, headlines, and news stories.

Voice Extensible Markup Language (VXML) is another new standard directed to delivering Internet content and data so that the content and data are accessible through voice-based devices. One objective of the VXML standard is to provide speech-enabled applications over the Internet. For example, VXML might be used to deliver the XML-formatted contents of a web page in an audible format for delivery to the computer speaker of a sight-impaired user.

Although WAP and VXML provide new ways of accessing web-based information, each standard has its limitations. Typically, VXML is implemented in applications involving speech recognition in which spoken commands are used to access information or complete transactions. Often, information in audio form is convenient, but applications are often limited by the need for a limited vocabulary or by a requirement that the user remember arcane verbal commands. While speech recognition technology is advancing, errors frequently occur.

WAP-enabled devices support the use of icons and other text-based menu selection tools to access information. For example, most WAP-enabled cellular telephones can deliver content in text-format and rudimentary graphics. Because the WAP-enabled cellular telephone must remain portable, WAP cellular telephone displays must remain small. Hence, it is likely to remain difficult for such cellular telephones to provide large amounts of text-based content or sophisticated graphics.

Therefore, there is a need in the art for an infrastructure that can deliver voice-based content to WAP-enabled wireless device, thereby enabling the device to deliver Internet content in an audible format. Preferably, the infrastructure will conform to a content format standard, such as VXML, and will enable the delivery of audible messages to a WAP-enabled wireless device and the processing of speech commands.

SUMMARY OF THE INVENTION

The present invention integrates components of a telephone system and existing and new Internet components to deliver voice-based content to Wireless Application Protocol (WAP) enabled wireless device, such as a cellular telephone. A WAP-enabled device can request text-based and/or voice based content from a WAP Server. The WAP device communicates over a conventional wireless service provider network using a base station connected to a conventional Mobile Switch. The wireless service provider network provides a connection between the WAP device and a WAP Gateway. The WAP Gateway operates as a gateway between the wireless service provider network and the TCP/IP-based Internet. WAP data requests are sent from the WAP gateway through the Internet to the WAP Server. Requests for voice-based content can also be delivered to the WAP Server over this path.

When a request for voice-based content delivery is received by the WAP Server, the WAP Server responds by sending a TCP/IP instruction to a Voice Portal Node. The Voice Portal Node acts as a gateway between the wireless service provider network and the TCP/IP-based Internet.

The Voice Portal Node is operative to establish a voice-based communication session with the WAP device. The Voice Portal Node does this by using the out-bound dialing module to initiate a wireless telephone call to the WAP device. The call initiation request is transmitted from the Voice Portal Node to a conventional AIN Central Office. The Central Office routes the call from the Voice Portal Node to the MSC. The MSC provides the necessary switching to connect the call between the Voice Portal Node and the WAP device.

When a telephonic connection has been established between the Voice Portal Node and the WAP device, the Voice Portal Node can provide a delivery authorization prompt to the WAP device. If the WAP device provides a voice-based delivery authorization to the Voice Portal Node, the Voice Portal Node will recognize the authorization by use of the speech recognition engine and will initiate the voice-based session. Once the voice session is begun, the Voice Portal Node will notify the WAP Server that the WAP device is ready for voice-based content delivery. The WAP Server will transmit voice-based content to the Voice Portal Node for delivery to the WAP device. The voice-based content is then delivered as an audible message played over the telephone connection established between the Voice Portal Node and the WAP device. Thus, voice-based content associated with the WAP-based content is delivered to the WAP device in response to a request initiated by the WAP device.

The various aspects of the present invention may be more clearly understood and appreciated from a review of the following detailed description of the disclosed embodiments and by reference to the drawings and claims.

BRIEF DESCRIPTION OF THE DRAWINGS

FIG. 5 depicts two cellular telephone Wireless Application Protocol devices that are exemplary embodiments of the present invention.

DETAILED DESCRIPTION

Figure 1:
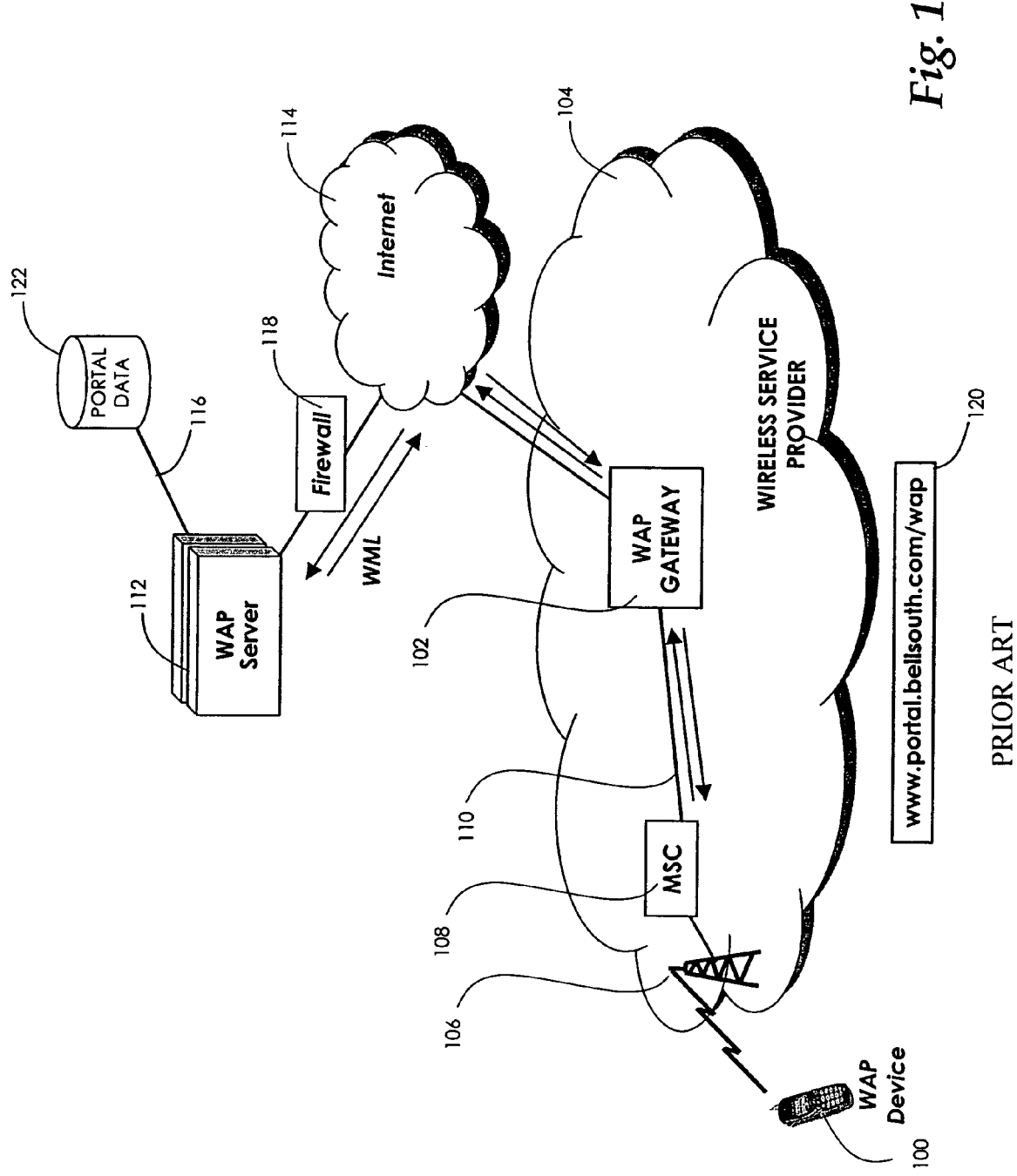
FIG. 1 is a block diagram depicting a conventional wireless application protocol content-delivery system.

FIG. 1 is a block diagram depicting a conventional Wireless Application Protocol (WAP) content-delivery system. Using a WAP device such as a cellular telephone 100, a user can contact a WAP Gateway 102 via a wireless service provider system 104. Typically, the cellular telephone 100 will communicate directly with a base station 106 that is connected through a Mobile Switching Center (MSC) 108 to a WAP Gateway 102. The WAP Gateway 102 will receive instructions from the cellular telephone 100 and will provide content to the cellular telephone, in response to those instructions. Typically, the data link between the MSC 108 and the WAP Gateway 102 will be a data-only connection 110. That is, instructions will be sent from the cellular telephone 100 to the WAP Gateway 102 in a data channel. Likewise, content will be delivered from the WAP Gateway 102 to the cellular telephone 100 over a data channel, not a voice channel.

The WAP Gateway 102 retrieves content from a WAP Server 112 by sending content requests over the Internet 114. The WAP data can be sent from the WAP Server 112 to the WAP Gateway 102 in various formats (e.g., Hypertext Markup Language), but would preferably be provided in Wireless Markup Language (WML). The WAP Gateway 102 and the WAP Server 112 can communicate by Transmission Control Protocol/Internet Protocol (TCP/IP). Communications between the WAP Gateway 102 and the WAP Server 112 can be channeled through a firewall 118. The firewall 118 is a well-known security device for protecting a server or other network component from unauthorized access via the Internet 114.

The WAP Server has a portal database 122 to which it can be connected over communications channel 116. The portal database 122 may store the content that is used by the WAP Server to provide content to the WAP Gateway 102. The WAP Server 112 can be connected to the portal database 122 over a data link 116. The data link 116 can be a TCP/IP connection, a hardwire connection, or a local area network connection. Of course, the portal database could also be integrated into the WAP Server 112. Those skilled in the art will appreciate that the WAP Server 112 could be used to provide content to WAP devices from various WAP portals. In such a case, the WAP Server may have more than one portal database 122. The desired portal can be identified initially by the WAP device 100 in a domain name format. For example, the WAP device may submit a domain name 120 that identifies a "BellSouth" portal. The domain name 120 may also include an indication that the WAP device 120 is requesting WAP content. In the example of FIG. 1, the domain name includes this indication as "/wap".

The WAP Server 112 may obtain raw content from the portal database 122 and compile the data into WML pages that are formatted specifically for a particular WAP device's display. For example, the request from the cellular telephone 100 through the WAP Gateway 102 may include a device identifier that can be used by the WAP Server 112 to determine the display capabilities of the WAP device. Once the server has packaged the WML content, it transmits the content over the Internet 114 to the WAP Gateway 102. The WAP Gateway 102 converts the packaged WAP content into a form that can be transmitted over the infrastructure of the wireless service provider 104 and transmits that content to the WAP device 100 via MSC 108 and base station 106.

The conventional WAP infrastructure depicted in FIG. 1 provides content to the WAP device 100 in a text-based format. The WAP device 100 can be used to enter a portal domain name 120 to establish a WAP communication session with the WAP Server 112. Once the WAP session is begun, the WAP device 100 can be used to traverse a menu provided by the WAP Server 112 and to request content that is identified in that menu. Once the content has been identified by the WAP device 100, the WAP Server 112 can provide the requested content in the form of WML pages. The pages are displayed on the WAP device's display. The user of the WAP device 100 can "browse" from page to page by pressing a predetermined key on the WAP device 100. Each key press may send a request to the WAP Server 112 for the next page of content. Alternatively, the WAP device 100 may include a memory buffer that permits the storage of multiple pages of WAP content that can be browsed without requiring single page requests to be sent to the WAP Server 112. While the conventional WAP device is ideal for menu navigation, the presentation of content is hampered by the limited ability of the WAP device to visually present content to a user.

Figure 2:
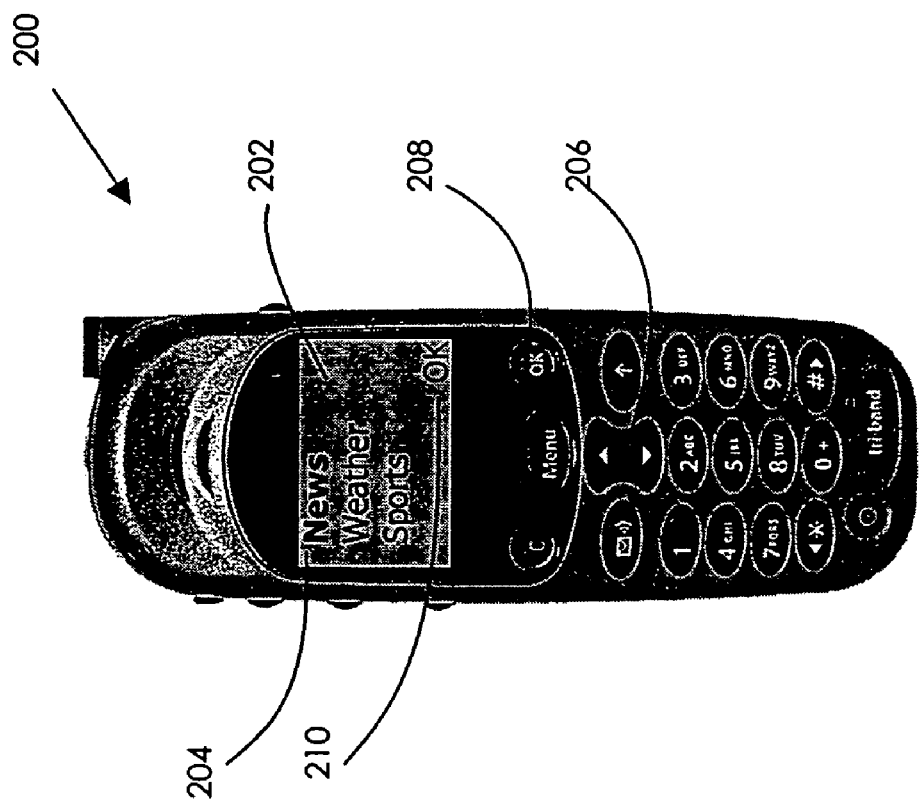
FIG. 2 depicts a conventional cellular telephone Wireless Application Protocol device displaying Wireless Application Protocol information.

FIG. 2 depicts a conventional cellular telephone WAP device 200 that has WAP information on its display 202. The WAP device 200 can be used to display a menu structure 204. By using a selection key 206, a user of the WAP device 200 can select menu items from the menu 204 for which the user would like to see WAP content. Once selected, the user can press a predefined submission button 208 to submit the request to the WAP Server (not shown). In the example of FIG. 2, the submission key 208 is labeled "OK" and corresponds to a submission message 210 on the display 202.

Figure 3:
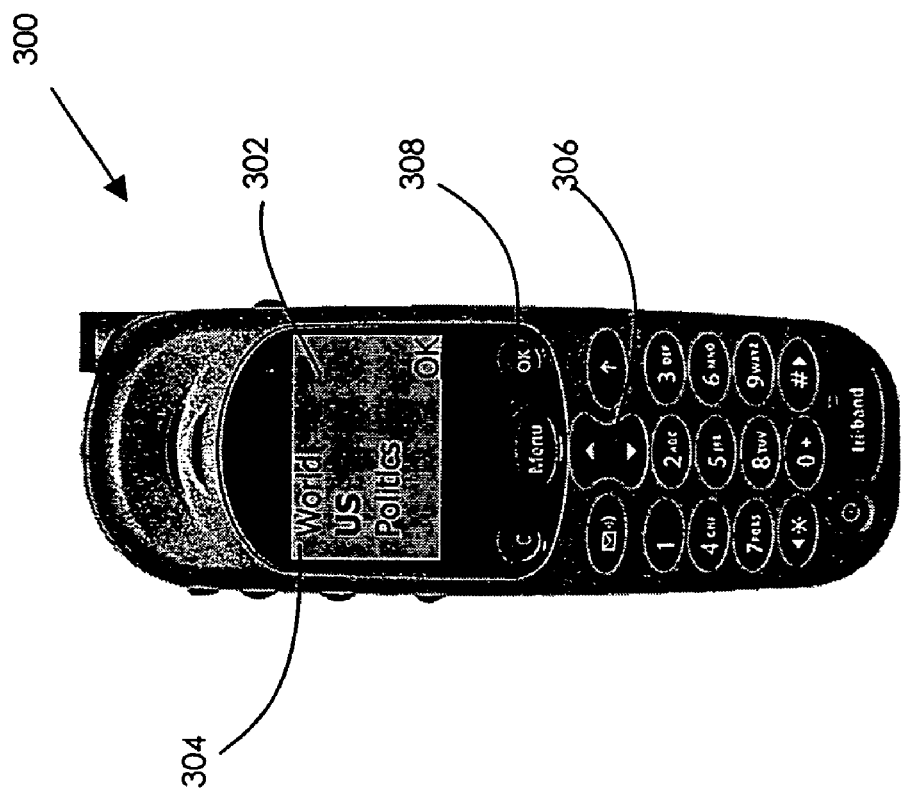
FIG. 3 depicts a conventional cellular telephone Wireless Application Protocol device displaying a page of Wireless Application Protocol content.

FIG. 3 depicts a conventional cellular telephone WAP device 300 displaying a page of WAP content. The display 302 of the WAP device 300 is displaying a second page of a menu structure provided by the WAP Server (not shown). In the example of FIG. 3, the menu page presented on the display 302 is provided in response to the selection of the "News" menu item from the menu page depicted in FIG. 2. The menu structure 304 provides three menu items. The selection of one of the menu items can result in the display of one or more headlines. The selection button 306 and the submission button 308 of the WAP device 300 could be used to select a headline. The selection of the headline would be sent back to the WAP Server (not shown) as a WAP content request. The WAP Server would return the associated WAP content (i.e., the news story) to the WAP device 300. The WAP device 300 would then display the WAP content on the WAP device's display 302.

Figure 4:
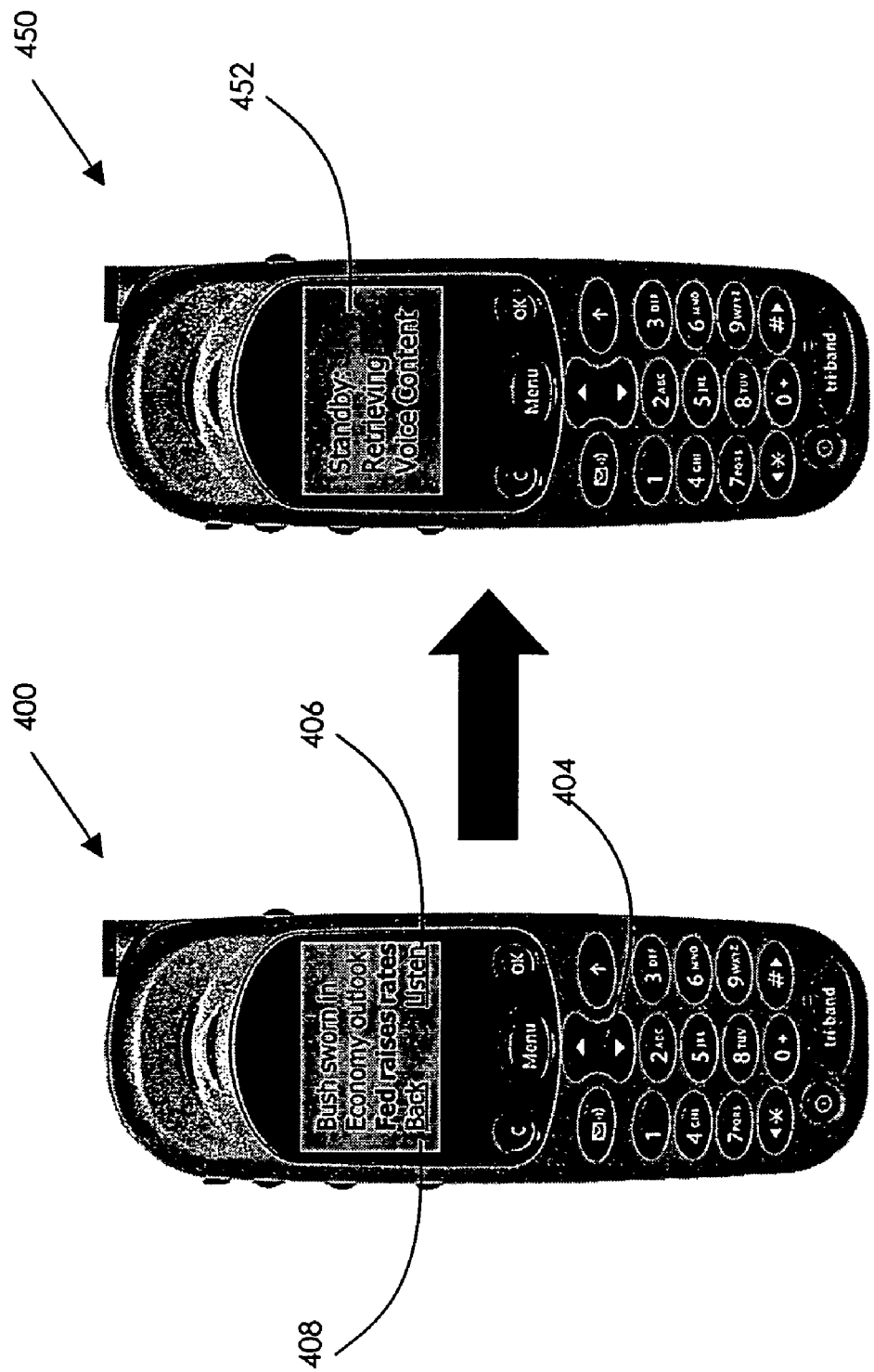
FIG. 4 depicts two cellular telephone Wireless Application Protocol devices that are exemplary embodiments of the present invention.

FIG. 4 depicts two cellular telephone WAP devices that are exemplary embodiments of the present invention. The first WAP device 400 is displaying three headlines that are provided, in response to the selection of the "U.S." menu item, as described in connection with FIG. 3. A particular headline can be selected by use of the selection key 404. In the conventional WAP-enabled cellular telephone, the selection of a headline would result in the delivery of WAP content to the cellular telephone. However, the WAP device 400 of an exemplary embodiment of the present invention can receive text-based content as well as voice-based content. The voice-based content will be delivered to the WAP device 400, in response to the selection of the "Listen" menu item 406. Alternatively, the "Back" menu item 408 can be selected to move back one level in the menu structure.

If the Listen menu item 406 is selected, the WAP device 400 will send a request for voice-based content to the WAP Server through the WAP Gateway (not shown). When the Listen menu item is selected, the display will show a "STANDBY: NOW RETRIEVING VOICE CONTENT" message as shown on the display 452 of the WAP device 450. Those skilled in the art will appreciate that the data session need not end in response to the commencement of the voice session. An alternative embodiment of the present invention enables the simultaneous delivery of voice and data sessions. This embodiment will be described in more detail in connection with FIG. 8.

FIG. 5 depicts two cellular telephone WAP devices 500, 550 that are exemplary embodiments of the present invention. The cellular telephone 500 is shown with the "Data Session Ended" message on the display 502. However, the cellular telephone 500 has received a voice-based communication from the WAP Server (not shown). The voice-based communication is referred to as a voice session. The voice-based content requested will be delivered to the cellular telephone 500, when the cellular telephone user responds to a delivery prompt. As described above, the Voice Portal Node establishes a voice-connection with the cellular telephone 500, thereby enabling the delivery of the voice-based content. The Voice Portal Node makes an out-bound call to the cellular telephone 500 using the cellular telephone's directory number that is provided by the WAP Gateway.

In the example of FIG. 5, the cellular telephone 500 prompts the user by playing an audible message "to hear requested information, say 'go'" 502. Those skilled in the art will appreciate that the delivery prompt could be text-based and the delivery authorization could be a key press, rather than an audible command. If the user issues the delivery authorization, the cellular telephone 550 will begin delivery of the voice-based content 552.

Figure 6:
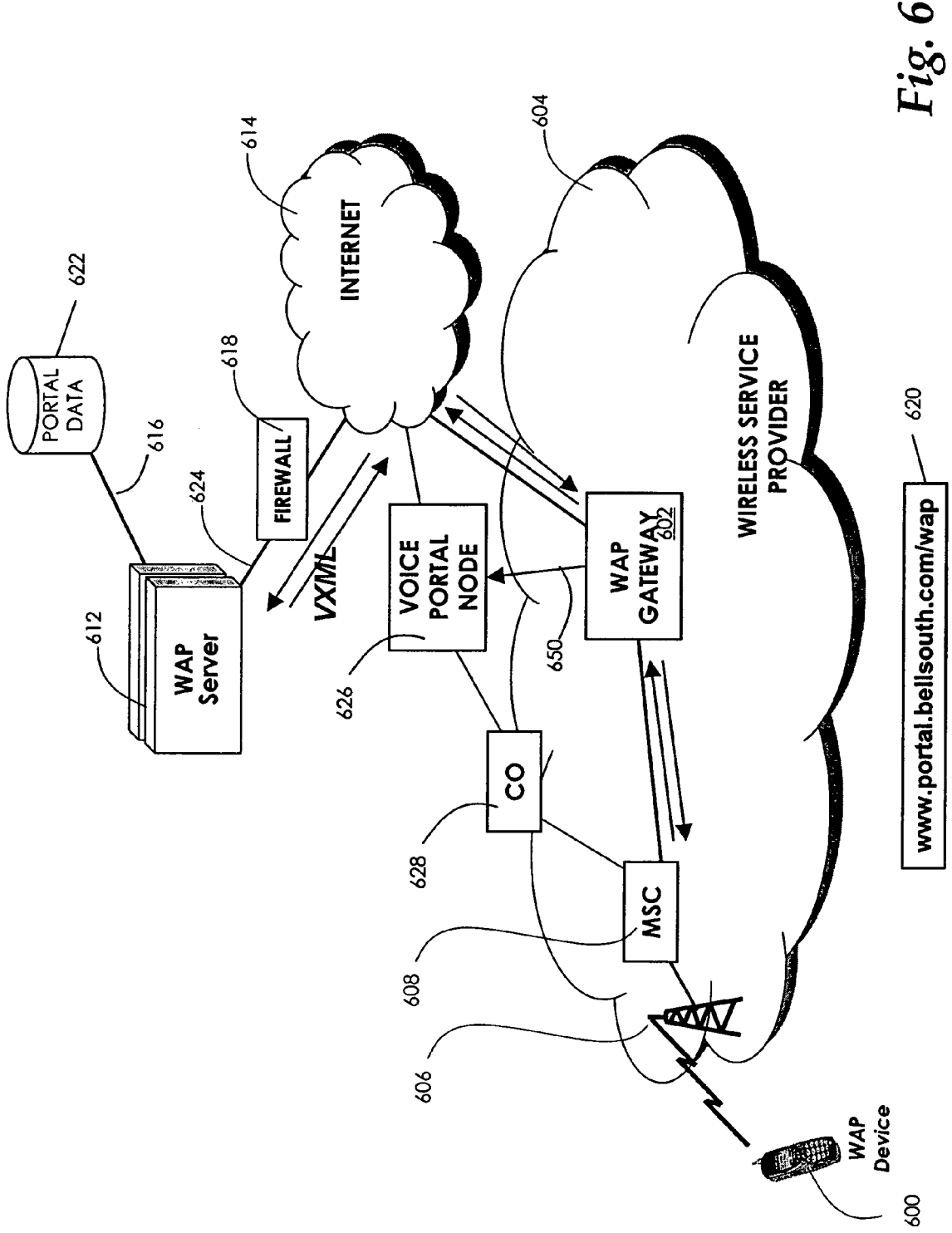
FIG. 6 depicts a voice and data content-delivery system that is an exemplary embodiment of present invention.

FIG. 6 depicts a voice and data content delivery system that is an exemplary embodiment of the present invention. As described in connection with FIGS. 1-5, a WAP device 600 can request text-based data from a WAP Server 612. The WAP device 600 communicates over the wireless service provider network 604, using base station 606 which is connected to an MSC 608. The wireless service provider network 604 provides a connection between the WAP device 600 and a WAP Gateway 602. The WAP Gateway 602 acts as a gateway between the wireless service provider network and the TCP/IP-based Internet 614. WAP data requests are sent from the WAP gateway 602 through the Internet 614 to the WAP Server 612. In addition, requests for voice-based content can also be delivered to the WAP Server 612 over this path.

When a request for voice-based content delivery is received by the WAP Server 612, it responds by sending a TCP/IP instruction to a Voice Portal Node 626 over a communication link 650. The Voice Portal Node 626 acts as a gateway between the wireless service provider network and the TCP/IP-based Internet 614. An exemplary Voice Portal Node has four main components: a) a VXML interpreter; b) a text-to-speech module; c) a speech recognition engine; and d) a out-bound dialing module. The Voice Portal Node 626 can establish a voice-based communication session with the WAP device 600 by using the dialing module to initiate a wireless telephone call to the WAP device 600. The WAP Gateway 602 passes a directory number of the WAP device 600 to the Voice Portal Node 626 as part of the TCP/IP instruction. The call initiation request is transmitted from the Voice Portal Node 626 to a conventional Advanced Intelligent Network central office 626. The central office 628 routes the call from the Voice Portal Node 626 to the MSC 604. The MSC 608 provides the necessary switching to connect the call between the Voice Portal Node 626 and the WAP device 600.

Once the call has been established between the Voice Portal Node 626 and the WAP device 600, the Voice Portal Node can provide a delivery authorization prompt to the WAP device 600. If the WAP device provides a voice-based delivery authorization to the Voice Portal Node 626, the Voice Portal Node will initiate the voice-based session.

Once the voice session is begun, the Voice Portal Node 626 will notify the WAP Server 612 that the WAP device 600 is ready for voice-based content delivery. The Voice Portal Node will request voice-based content. The WAP Server will transmit voice-based content to the Voice Portal Node 626 for delivery to the WAP device 600. In an exemplary embodiment of the present invention, the voice-based content will be transmitted from the WAP Server 612 to the Voice Portal Node in Voice Extensible Markup Language (VXML). The Voice Portal Node uses the VXML interpreter to receive the voice-based content and then uses the text-to-speech module to convert the received content to an audible message. Those skilled in the art will appreciate that virtually any data format could be used to transmit the voice content between the WAP Server 612 and the Voice Portal Node 626. The Voice Portal Node 626 converts the VXML voice data to an audible transmission. The audible transmission is then played back over the telephone connection established between the Voice Portal Node 626 and the WAP device 600. Thus, voice-based content is delivered to the WAP device 600 in response to a request initiated by the WAP device.

Figure 7:
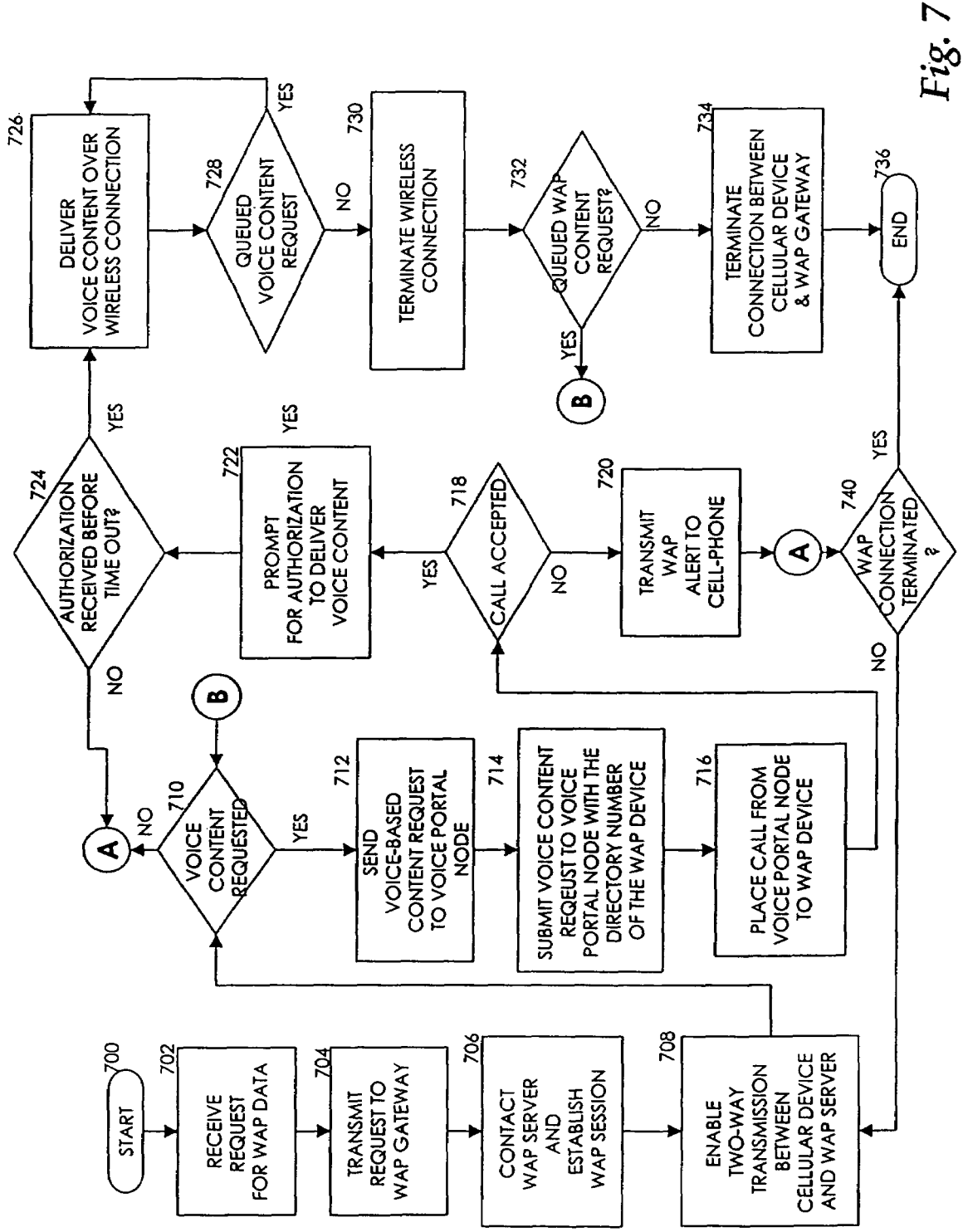
FIG. 7 is a flow chart depicting an exemplary method for providing voice and text-based content to a Wireless Application Protocol device.

FIG. 7 is a flow chart depicting an exemplary method for providing voice and text-based content to a WAP device. The method starts at step 700 and proceeds to step 702. At step 702, a request for WAP data is received. The method then proceeds to step 704, wherein a WAP data request is transmitted to a WAP Gateway. The WAP data request includes the telephone number (directory number) of the WAP device that has generated the data request. The method proceeds from step 704 to step 706. At step 706, the WAP Server is contacted and a WAP session is established. The method then proceeds to step 708.

At step 708, a two-way transmission (data session) is established between the cellular device and the WAP Server. The method proceeds from step 708 to decision block 710. At decision block 710, a determination is made as to whether voice content is requested. If voice content is not requested, the method branches to decision block 740 (via connector A). At decision block 740, a determination is made as to whether the WAP session is terminated. For example, the WAP session may be terminated by the selection of a menu item ending the data session. If the data session is terminated, the method branches to step 736 and ends. If the data session is not terminated, the method branches to step 708 and two way data transmission is continued between the cellular device and the WAP Server.

Returning now to decision block 710, if a determination is made that voice content has been requested, the method branches to step 712. At step 712, a voice-based content request is sent to the WAP Gateway. The method then proceeds to step 714. At step 714, the voice content request is submitted to the WAP Server. The method then proceeds to step 716, wherein a call is placed to the cellular device. As discussed above in connection with FIG. 6, this step may be performed by a Voice Portal Node using the cellular device's directory number obtained from the WAP Gateway.

The method then proceeds to decision block 718. At decision block 718, a determination is made as to whether the call is accepted. If the call is not accepted, the method branches to step 720. At step 720, an alert is transmitted to the cellular device indicating that the voice-based content cannot be delivered. The method then branches to decision block 740 and proceeds as described above.

Returning now to decision block 718, if a determination is made that the call is accepted, the method branches to step 722. At step 722, a prompt is provided for authorization to deliver voice content to the cellular device. The method then proceeds to decision block 724. At decision block 724, a determination is made whether a delivery authorization is received before some predefined time out period. If a determination is made that the authorization was not received, the method branches to decision block 740 and proceeds as described above. If, on the other hand, a determination is made at decision block 724 that authorization has been received, the method branches to step 726.

At step 726, the Voice Portal Node retrieves the voice content from the WAP server and delivers the voice content to the cellular device. This step 726 may include a conversion step in which, for example, VXML-based data is translated to an audible transmission. The method then proceeds to decision block 728. At decision block 728, a determination is made as to whether there is a queued content request. That is, a determination is made as to whether the user of the cellular device has requested the delivery of voice content in addition to the voice content delivered in step 726. If a queued voice content request exists, the method branches back to step 726 and that voice content is delivered. This loop can be continued as long as voice content requests are queued. If a determination is made at step 728 that no voice content requests are queued, the method branches to step 730.

At step 730, the wireless connection is terminated between the Voice Portal Node and the cellular device. The method proceeds from step 730 to decision block 732. At decision block 732, a determination is made as to whether any data content requests are queued. That is, a determination is made as to whether the cellular device user has requested the delivery of additional data content. If a determination is made that additional data content has been requested, the method branches to step 710 and proceeds as described above. If, on the other hand, a determination is made that no further data content has been requested, the method branches from decision block 732 to step 734. At step 734, the connection between the cellular device and the WAP Gateway is terminated. In an alternative embodiment, step 734 may be conditioned on a determination that the user has affirmatively requested the termination of the connection between the cellular device and the WAP Gateway. The method branches from step 734 to step 736 and ends.

In an alternative embodiment of the present invention, both voice-based and WAP-based content can be delivered to the WAP device simultaneously. In this embodiment, the WAP session is not ended, prior to the initiation of the voice session. Consequently, the user of the WAP device can listen to voice-based content and then navigate a WAP-based menu structure to find other voice-based content that can be delivered.

Figure 8:
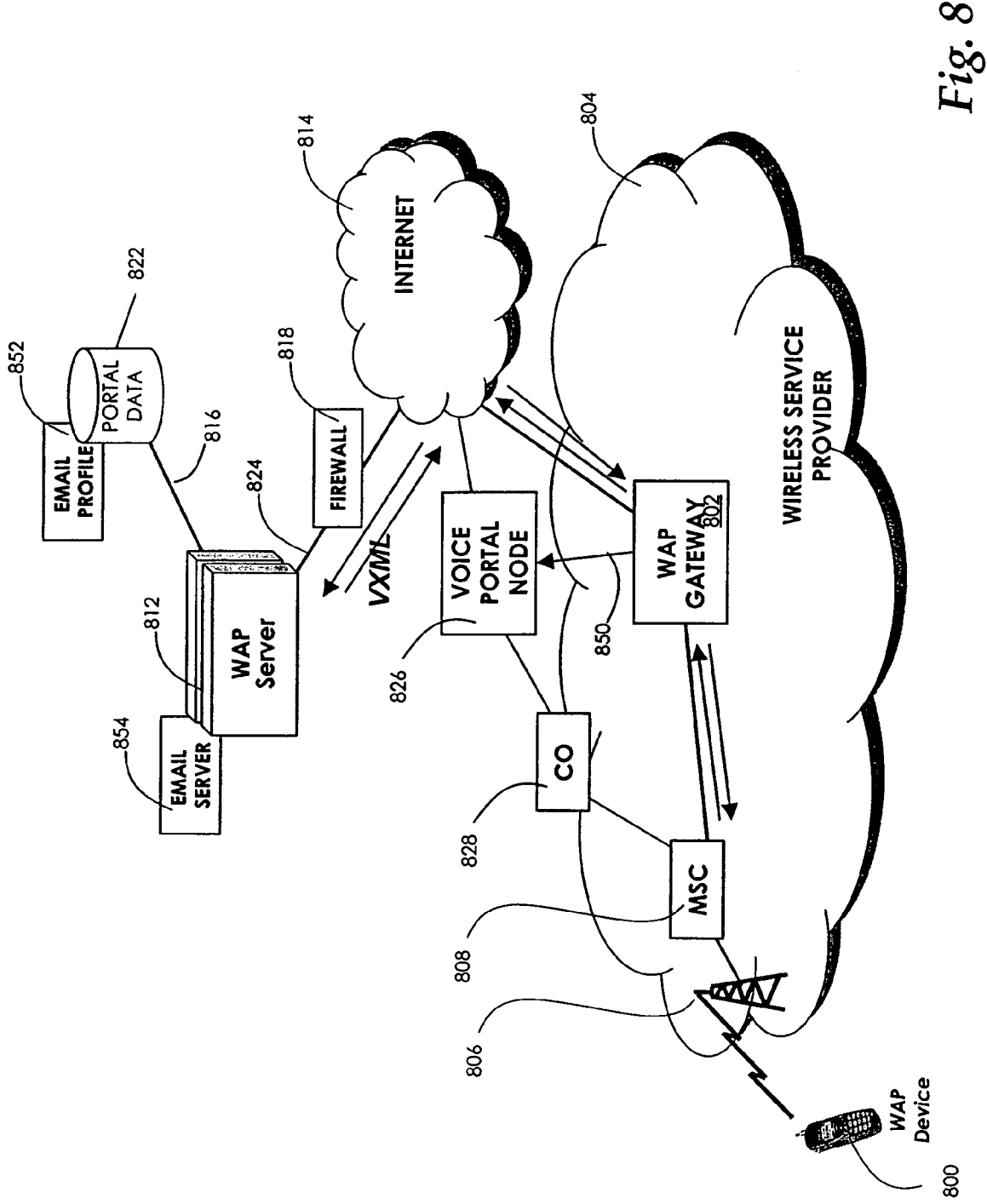
FIG. 8 is a block diagram depicting an alternative embodiment of the present invention.

FIG. 8 is a block diagram depicting an alternative embodiment of the present invention. In this embodiment, the WAP device 800 can be used to request delivery of content through other means. For example, the WAP device 800 could be used to request that content be delivered to an email address. The WAP Server 812 could request the entry of the email address, via the WAP device keypad. Alternatively, the WAP Server could maintain an email address for each WAP device in an email profile 852 maintained in the portal database 822. In either case, the WAP Server could be equipped with an email server 854 that functions to route email-versions of the WAP content to one or more email addresses identified by the WAP device user or by the WAP device's email profile 852.

The content could then be delivered to the entered email address. Of course, the email profile 852 could maintain an address book for a WAP device user and could permit the user to email content to various email addresses. An email recipient could be identified through the use of a menu on the WAP device's display or through a spoken command.

Those skilled in the art will appreciate that the same technique could be used to deliver the content to other delivery points, including, but not limited to, a physical street address.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A wireless device for receiving voice-based content sent to a user of the wireless device from a Wireless Application Protocol (WAP) system, the wireless device operative to:
    send a voice-based content request to a WAP server;
    receive a wireless telephone call from a Voice Portal Node wherein the Voice Portal Node comprises an out-bound dialing module operative to initiate the telephone call to the wireless device, in response to receiving instructions from the WAP server to establish a connection between the wireless device and the Voice Portal Node; and
    receive an audio message that provides the requested voice-based content over the telephone call.

2. The wireless device of claim 1, wherein the wireless device sends the voice-based content request to the WAP Server via a WAP Gateway.

3. The wireless device of claim 1, wherein the WAP Server sends the instructions to the Voice Portal Node via a WAP Gateway to establish a connection between the wireless device and the Voice Portal Node.

4. The wireless device of claim 1, wherein the wireless device receives a delivery authorization voice prompt from the Voice Portal Node for authorization to deliver voice-based content to the wireless device.

5. The wireless device of claim 2, wherein the Voice Portal Node comprises a gateway between a wireless service provider network and a TCP/IP based Internet.

6. The wireless device of claim 1, wherein the voice-based content received at the wireless device is received from the Voice Portal Node further operative to receive the voice-based content from the WAP Server and to deliver the voice-based content to the wireless device.

7. The wireless device of claim 6, wherein the voice-based content is received at the Voice Portal Node in Voice Extensible Markup Language (VXML) format.

8. The wireless device of claim 7, wherein the voice-based content is converted from a VXML format to the audio message at the Voice Portal Node.

9. The wireless device of claim 1, wherein the WAP Server is further operative to send an email message containing the voice-based content to an email address.

10. The wireless device of claim 1, wherein the wireless device is further operative to concurrently receive voice-based and text-based content provided by the WAP Server.

11. A method for receiving voice-based content and text-based content from a Wireless Application Protocol (WAP) server, the method comprising:
   sending a voice-based content request to the WAP server, the WAP server sends an instruction to a Voice Portal Node to facilitate a connection between a WAP device and the Voice Portal Node;
   receiving wireless telephone call from the Voice Portal Node, the Voice Portal Node comprising an out-bound dialing module operative to initiate the wireless telephone call and establish a telephonic connection between the WAP device and the Voice Portal Node; and
   receiving the voice-based content as an audio message at the WAP device over the telephonic connection, the voice-based content is converted to the audio message by the Voice Portal Node.

12. The method of claim 11, further comprising sending a user instruction over the telephonic connection to modify reception of the voice-based content.

13. The method of claim 11, further comprising, translating the voice-based content from a Voice Extensible Markup Language (VXML) format prior to receiving the voice-based content at the WAP device.

14. The method of claim 11, further comprising sending an audible voice user instruction wherein the audible voice user instruction is translated to a Voice Extensible Markup Language (VXML) format for delivery to the WAP Server.

15. The method of claim 11, further comprising:
   accessing a WAP-enabled web site associated with the WAP Server; and
   transmitting the content request to the WAP Server, via the WAP-enabled web site.

16. The method of claim 13, further comprising playing the audio message via the wireless device.

17. A system that facilitates receiving and presenting voice-based content and text-based content to a user of a WAP (wireless application protocol) device, comprising:
   means for receiving, at the WAP device, a wireless telephone call from a Voice Portal Node in response to sending a voice-based content request, wherein the Voice Portal Node initiates the wireless telephone call in response to receiving instructions from a WAP server to establish the connection between the WAP device and the Voice Portal Node;
   means for receiving the voice-based content played as an audio message over the telephone call; and
   means for receiving the voice-based content and the text-based content provided by the WAP Server.

18. The system of claim 17, further comprising means for sending a user authorization in response to a delivery authorization voice prompt provided by the Voice Portal Node.

19. The system of claim 17, further comprising means for forwarding the voice-based content request to the WAP server over a Transport Control Protocol/Internet Protocol (TCP/IP) data channel.

20. The system of claim 17, further comprising means for sending a user instruction to modify reception of the voice-based content.

* * * * *